(12) United States Patent
Onomura

(10) Patent No.: US 11,736,658 B2
(45) Date of Patent: Aug. 22, 2023

(54) IMAGE PICKUP APPARATUS, IMAGE PICKUP METHOD, AND STORAGE MEDIUM

(71) Applicant: Olympus Corporation, Hachioji (JP)

(72) Inventor: Kenichi Onomura, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 17/824,543

(22) Filed: May 25, 2022

(65) Prior Publication Data

US 2022/0400215 A1 Dec. 15, 2022

(30) Foreign Application Priority Data

Jun. 9, 2021 (JP) ................................. 2021-096922

(51) Int. Cl.
| | |
|---|---|
| *H04N 5/265* | (2006.01) |
| *G06T 7/223* | (2017.01) |
| *G06T 7/246* | (2017.01) |
| *G06T 3/40* | (2006.01) |
| *G06T 7/262* | (2017.01) |
| *H04N 23/72* | (2023.01) |

(52) U.S. Cl.
CPC ........... *H04N 5/265* (2013.01); *G06T 3/4053* (2013.01); *G06T 7/223* (2017.01); *G06T 7/246* (2017.01); *G06T 7/262* (2017.01); *H04N 23/72* (2023.01); *G06T 2207/10144* (2013.01); *G06T 2207/20056* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2016/0301847 | A1* | 10/2016 | Okazawa | H04N 23/73 |
| 2020/0175660 | A1* | 6/2020 | Iijima | G06T 5/009 |
| 2021/0035308 | A1* | 2/2021 | Jung | G06T 7/246 |

FOREIGN PATENT DOCUMENTS

| | | | |
|---|---|---|---|
| JP | 5133921 B | 1/2013 | |
| JP | 2014-160987 A | 9/2014 | |
| JP | 2015-053652 A | 3/2015 | |
| JP | 2019-083364 A | 5/2019 | |
| WO | WO-2013073355 A1 * | 5/2013 | ........... G06T 7/2033 |

OTHER PUBLICATIONS

English translation of WO 2013073355 A1, Iketani, 2013 (Year: 2013).*

* cited by examiner

*Primary Examiner* — James M Hannett
(74) *Attorney, Agent, or Firm* — John C. Pokotylo; Pokotylo Patent Services

(57) ABSTRACT

An image pickup apparatus includes a lens, an image pickup device, and a processor. The processor acquires a plurality of pieces of first image data and second image data with an exposure time period longer than an exposure time period of the first image data from the image pickup device, detects a motion region by using the first image data and the second image data, and acquires motion detection information by using the plurality of pieces of first image data. The processor changes a synthesis method in accordance with whether the motion region is detected and generates one piece of synthesized image data.

20 Claims, 13 Drawing Sheets

FIG. 10

| | -1 | |
|---|---|---|
| -1 | 4 | -1 |
| | -1 | |

FIG. 11

| | R | Gr | R | Gr | ... | R | Gr | R | Gr |
|---|---|---|---|---|---|---|---|---|---|
| LINE A | Gb | B | Gb | B | ... | Gb | B | Gb | B |
| LINE B | R | Gr | R | Gr | ... | R | Gr | R | Gr |
| | Gb | B | Gb | B | ... | Gb | B | Gb | B |
| LINE A | R | Gr | R | Gr | ... | R | Gr | R | Gr |
| | Gb | B | Gb | B | ... | Gb | B | Gb | B |
| LINE B | R | Gr | R | Gr | ... | R | Gr | R | Gr |
| | Gb | B | Gb | B | ... | Gb | B | Gb | B |
| | ... | ... | ... | ... | ... | ... | ... | ... | ... |
| LINE A | R | Gr | R | Gr | ... | R | Gr | R | Gr |
| | Gb | B | Gb | B | ... | Gb | B | Gb | B |
| LINE B | R | Gr | R | Gr | ... | R | Gr | R | Gr |
| | Gb | B | Gb | B | ... | Gb | B | Gb | B |

IMAGE PICKUP APPARATUS, IMAGE PICKUP METHOD, AND STORAGE MEDIUM

CROSS REFERENCE TO RELATED APPLICATION

This application claims benefit of Japanese Application No. 2021-096922 filed in Japan on Jun. 9, 2021, the entire contents of which are incorporated herein by this reference.

BACKGROUND OF THE INVENTION

1. Field of the Invention

The invention relates to an image pickup apparatus, an image pickup method, and a storage medium for detecting motion of an object image in image data and synthesizing a plurality of pieces of image data.

2. Description of the Related Art

Technologies of generating one synthesized image by synthesizing a plurality of pieces of image data have been conventionally disclosed. Such an image synthesis technology is used to generate, for example, an image having a resolution higher than a resolution of a shot image, or an image having a dynamic range wider than a dynamic range of a shot image.

When images include a camera-shake or a moving object in synthesizing a plurality of images, it is necessary to perform the synthesis after performing motion detection and positioning of the images based on a result of the detection. Typical motion detection of an object image in image data often employs a block matching (BM) method. The BM method uses, for example, a difference between pixel values and thus is preferably performed with two images of the same exposure time period to increase accuracy of position detection.

For example, Japanese Patent Application Laid-Open Publication No. 2014-160987 discloses that, when a high dynamic range (HDR) image is to be synthesized from two images of different exposure time periods, two short-exposure images are picked up in a duration in which one long-exposure image is picked up, and motion detection is performed based on the two short-exposure images.

SUMMARY OF THE INVENTION

An image pickup apparatus according to an aspect of the invention includes a lens through which an optical image of an object is formed, an image pickup device configured to generate image data through exposure to the optical image, and a processor. The processor causes the image pickup device to perform exposure in a first exposure time period a plurality of times and acquires a plurality of pieces of first image data with different exposure time points from the image pickup device. The processor causes the image pickup device to perform exposure in a second exposure time period longer than the first exposure time period and acquires second image data from the image pickup device. The processor detects a motion region in the image data by performing frequency analysis on certain first image data among the plurality of pieces of first image data and the second image data. The processor acquires motion detection information of an object image in the image data by performing block matching on the plurality of pieces of first image data. The processor changes a method of generating synthesized image data based on the motion detection information in accordance with whether the motion region is detected. The processor generates one piece of synthesized image data by synthesizing the plurality of pieces of first image data.

An image pickup method according to an aspect of the invention is an image pickup method for an image pickup apparatus including a lens through which an optical image of an object is formed and an image pickup device configured to generate image data through exposure to the optical image. The image pickup method causes the image pickup device to perform exposure in a first exposure time period a plurality of times and acquires a plurality of pieces of first image data with different exposure time points from the image pickup device. The image pickup method causes the image pickup device to perform exposure in a second exposure time period longer than the first exposure time period and acquires second image data from the image pickup device. The image pickup method detects a motion region in the image data by performing frequency analysis on certain first image data among the plurality of pieces of first image data and the second image data. The image pickup method acquires motion detection information of an object image in the image data by performing block matching on the plurality of pieces of first image data. The image pickup method changes a method of generating synthesized image data based on the motion detection information in accordance with whether the motion region is detected. The image pickup method generates one piece of synthesized image data by synthesizing the plurality of pieces of first image data.

A storage medium according to an aspect of the invention is a non-transitory storage medium that is readable by a computer and stores a computer program for causing the computer to control an image pickup apparatus including a lens through which an optical image of an object is formed and an image pickup device configured to generate image data through exposure to the optical image. The computer program causes the computer to cause the image pickup device to perform exposure in a first exposure time period a plurality of times and acquire a plurality of pieces of first image data with different exposure time points from the image pickup device. The computer program causes the computer to cause the image pickup device to perform exposure in a second exposure time period longer than the first exposure time period and acquire second image data from the image pickup device. The computer program causes the computer to detect a motion region in the image data by performing frequency analysis on certain first image data among the plurality of pieces of first image data and the second image data. The computer program causes the computer to acquire motion detection information of an object image in the image data by performing block matching on the plurality of pieces of first image data. The computer program causes the computer to change a method of generating synthesized image data based on the motion detection information in accordance with whether the motion region is detected and generate one piece of synthesized image data by synthesizing the plurality of pieces of first image data.

BRIEF DESCRIPTION OF THE DRAWINGS

FIG. 10 is a diagram illustrating an example of a filter used for frequency analysis in the above-described first embodiment;

FIG. 11 is a diagram illustrating an example of an image pickup device that can differentiate an exposure time period between lines in a second embodiment of the invention;

DETAILED DESCRIPTION OF THE PREFERRED EMBODIMENTS

Embodiments of the invention will be described below with reference to the accompanying drawings. However, the invention is not limited by the embodiments described below.

First Embodiment

Figure 1:
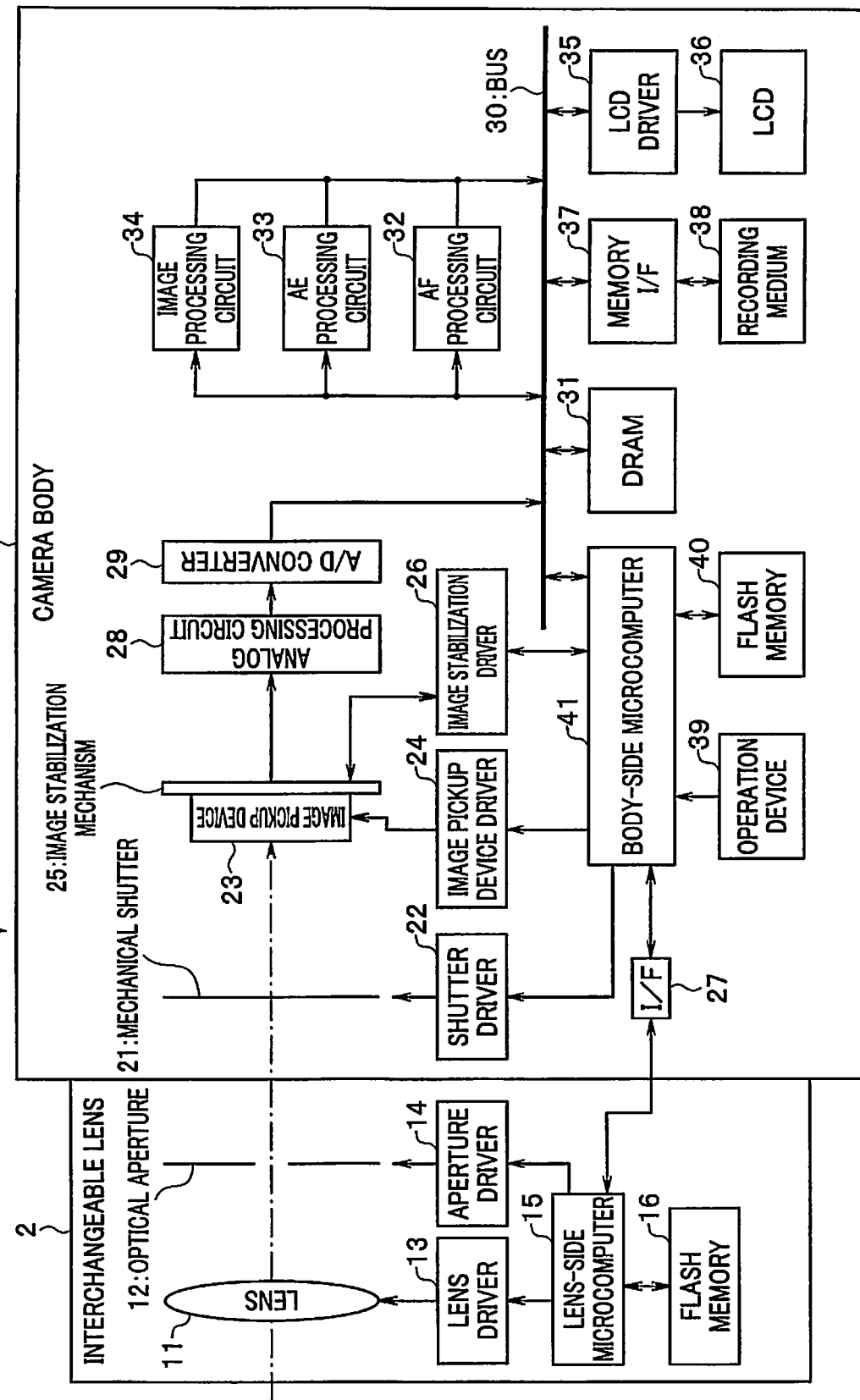
FIG. 1 is a block diagram illustrating a configuration of an image pickup apparatus in a first embodiment of the invention.

FIGS. 1 to 10 illustrate a first embodiment of the invention, and FIG. 1 is a block diagram illustrating a configuration of an image pickup apparatus 1.

Note that the present embodiment is described with, for example, a digital camera as the image pickup apparatus 1, but the image pickup apparatus 1 is not limited to a digital camera and may be any device having an image pickup function. The digital camera is, for example, a lens-interchangeable camera but may be a lens-integrated camera.

The image pickup apparatus 1 has a configuration in which an interchangeable lens 2 is removably connected to a camera body 3 by using a lens mount or the like.

The interchangeable lens 2 includes a lens 11, an optical aperture 12, a lens driver 13, an aperture driver 14, a lens-side microcomputer 15, and a flash memory 16.

The lens 11 is a lens unit that is configured as, for example, a shooting optical system including one or more optical lenses and through which an optical image (object image) of an object is formed on an image pickup device 23 of the camera body 3, which will be described later.

The optical aperture 12 controls a passing range of a light beam from the lens 11 toward the image pickup device 23 to adjust light intensity of an object image formed through the lens 11.

The lens driver 13 adjusts a focus position by driving the lens 11 based on a command from the lens-side microcomputer 15.

The aperture driver 14 changes an opening diameter by driving the optical aperture 12 based on a command from the lens-side microcomputer 15. With the drive by the optical aperture 12, brightness of an object image changes, and also an amount of bokeh and the like change as well.

The flash memory 16 is a recording medium that records a control program executed by the lens-side microcomputer 15 and various kinds of information related to the interchangeable lens 2.

The lens-side microcomputer 15 is connected to the lens driver 13, the aperture driver 14, the flash memory 16, and an interface (I/F) 27 to be described later. Through the interface 27, the lens-side microcomputer 15 communicates with a body-side microcomputer 41 to be described later, receives a command from the body-side microcomputer 41, reads/writes information recorded in the flash memory 16, and controls the lens driver 13 and the aperture driver 14. In addition, the lens-side microcomputer 15 transmits various kinds of information related to the interchangeable lens 2 to the body-side microcomputer 41.

The camera body 3 includes a mechanical shutter 21, a shutter driver 22, the image pickup device 23, an image pickup device driver 24, an image stabilization mechanism 25, an image stabilization driver 26, an interface (I/F) 27, an analog processing circuit 28, an analog/digital converter (A/D converter) 29, a bus 30, a dynamic random access memory (DRAM) 31, an autofocus (AF) processing circuit 32, an auto exposure (AE) processing circuit 33, an image processing circuit 34, a liquid crystal display (LCD) driver 35, an LCD 36, a memory interface (memory I/F) 37, a recording medium 38, an operation device 39, a flash memory 40, and the body-side microcomputer 41.

The mechanical shutter 21 is disposed between the lens 11 and the image pickup device 23 and controls a time period in which a light beam from the lens 11 reaches the image pickup device 23. The mechanical shutter 21 is, for example, an optical shutter configured with a traveling shutter screen.

The shutter driver 22 opens and closes the mechanical shutter 21 by driving the mechanical shutter 21 based on a command from the body-side microcomputer 41.

The shutter driver 22 controls a time period in which a light beam reaches the image pickup device 23, in other words, a time period in which the image pickup device 23 is exposed to an object by driving the mechanical shutter 21 based on a command from the body-side microcomputer 41, for example, at still image shooting.

The shutter driver 22 maintains the mechanical shutter 21 in an open state based on a command from the body-side microcomputer 41 at, for example, moving image shooting or live view. In this case, acquisition of each frame image is performed by a function of an electronic shutter included in the image pickup device 23. However, the electronic shutter may be used at still image shooting.

The image pickup device 23 is an image pickup unit including a pixel unit in which a plurality of pixels are two-dimensionally arrayed at a predetermined pixel pitch, and configured to expose the plurality of pixels to an object image and generate electric image data. Specifically, the image pickup device 23 generates an analog image signal by photoelectrically converting an object image formed through the lens 11 and the optical aperture 12 based on control by the body-side microcomputer 41 as an image pickup control unit.

The image pickup device 23 of the present embodiment is configured as a color image pickup device including color filters and includes a plurality of kinds of pixels having different filter colors. Specifically, the pixels include three kinds of pixels, namely, a G pixel on which a G (green) filter is disposed, an R pixel on which an R (red) filter is disposed, and a B pixel on which a B (blue) filter is disposed. The G pixel is further classified into two kinds, namely, a Gr pixel disposed on a line on which the R pixel is disposed and a Gb pixel disposed on a line on which the B pixel is disposed.

More specifically, the color filters of the image pickup device 23 are R, G, and B filters arrayed in a mosaic pattern of a primary color Bayer array.

As well known, the primary color Bayer array includes (2, 2) pixels as a basic array of a plurality of kinds of pixels in a configuration in which G pixels are disposed at opposing corners of the basic array and an R pixel and a B pixel are disposed at the other opposing corners (refer to FIG. 11 to be described later). In this case, as described above, a G pixel disposed on a line on which the R pixel is disposed is a Gr pixel, and a G pixel disposed on a line on which the B pixel is disposed is a Gb pixel.

The image pickup device 23 has a configuration in which the basic array of (2, 2) pixels are periodically repeated in two-dimensional directions.

Note that the pixel array of the image pickup device 23 is not limited to the Bayer array but may be any other pixel array. Thus, the basic array is not limited to (2, 2) pixels.

The image pickup device driver 24 causes the image pickup device 23 to pick up an image by driving the image pickup device 23 based on a command from the body-side microcomputer 41.

The image stabilization mechanism 25 relatively shifts positions of an object image and the image pickup device 23 in a direction orthogonal to an optical axis of the lens 11 in a predetermined movable range. The image stabilization mechanism 25 illustrated in FIG. 1 relatively shifts the positions of an object image and the image pickup device 23 by shifting the image pickup device 23 to reduce image-shake. However, the image stabilization mechanism 25 is not limited to this configuration but may correct image-shake by moving at least part of the lens 11 or may have both the configuration of shifting the image pickup device 23 and the configuration of moving at least part of the lens 11.

Specifically, the image stabilization mechanism 25 includes, for example, a Hall sensor and a voice coil motor. The image stabilization mechanism 25 floats the image pickup unit including the image pickup device 23 in space with magnetic force by the voice coil motor, detects a position of the image pickup unit by the Hall sensor, and moves the position by controlling the magnetic force. However, the image stabilization mechanism 25 is not limited to such a configuration that uses a voice coil motor and a Hall sensor, but may employ an appropriate configuration that uses another drive source and another position detection unit.

The image stabilization driver 26 is an image stabilization control unit that controls the image stabilization mechanism 25 to perform image stabilization that reduces movement of an object image formed on the image pickup device 23 and perform pixel shift for generating a high-resolution image. The image stabilization driver 26 received feedback on a control state of the image stabilization mechanism 25 and controls the image stabilization mechanism 25 based on a control command from the body-side microcomputer 41.

The pixel shift is processing that shifts the relative positions of an object image and the image pickup device 23 in a movement unit equal to or smaller than the pixel pitch (for example, units of one pixel pitch, units of 0.5 pixel pitch, or units of 0.3 pixel pitch) when a pixel shift super-resolution shooting mode is set.

The body-side microcomputer 41 generates a control command for controlling the image stabilization driver 26, based on an output from a non-illustrated shake amount detection sensor or the like for detecting a shake amount of, for example, camera-shake occurring to the image pickup apparatus 1. Then, the image stabilization driver 26 performs image stabilization by controlling, based on the control command from the body-side microcomputer 41, the image stabilization mechanism 25 to shift the image pickup device 23 to cancel a detected image-shake (in other words, by a shift amount equal to a size of the detected image-shake in a direction opposite to a direction of the detected image-shake).

The interface 27 connects the lens-side microcomputer 15 and the body-side microcomputer 41 so that bidirectional communication can be performed between the microcomputers.

The analog processing circuit 28 performs reduction of reset noise and the like and then waveform shaping on an analog image signal read from the image pickup device 23, and also performs gain-up to obtain intended brightness.

The A/D converter 29 converts the analog image signal outputted from the analog processing circuit 28 into digital image signal (RAW image data).

The bus 30 is a forwarding path through which various kinds of data and control signals generated at a place in the image pickup apparatus 1 are forwarded to another place in the image pickup apparatus 1. The bus 30 in the present embodiment is connected to the A/D converter 29, the DRAM 31, the AF processing circuit 32, the AE processing circuit 33, the image processing circuit 34, the LCD driver 35, the memory I/F 37, and the body-side microcomputer 41.

The RAW image data outputted from the A/D converter 29 is forwarded through the bus 30 and temporarily stored in the DRAM 31.

The DRAM 31 is a storage element that temporarily stores various kinds of data such as the above-described RAW image data and image data processed at the image processing circuit 34 and the like.

The AF processing circuit 32 extracts a signal of a high frequency component from the RAW image data inputted through the bus 30 and acquires an in-focus evaluation value through AF (autofocus) integration processing. The acquired in-focus evaluation value is used for AF drive of the lens 11. Note that AF is not limited to such contrast AF, but for example, phase difference AF using a dedicated AF sensor (or AF pixels in the image pickup device 23) may be performed.

The AE processing circuit 33 extracts a luminance component from the RAW image data inputted through the bus 30 and calculates an appropriate exposure condition (values such as Tv, Av, and Sv with which appropriate exposure is performed) based on the extracted luminance component. The calculated appropriate exposure condition is used for auto exposure (AE) control. Specific examples of the AE control include control of the optical aperture 12 based on the Av value, control of the mechanical shutter 21 based on the Tv value, exposure timing control (what is called electronic shutter control) of the image pickup device 23 based on the Tv value, and gain control of the analog processing circuit 28 (or digital gain control of the image processing circuit 34 or the like) based on the Sv value.

The image processing circuit 34 performs various kinds of image processing such as OB subtraction, white balance (WB) gain, demosaicing, noise reduction, color conversion, gamma conversion, and scaling on the RAW image data inputted through the bus 30. Note that data compression/decompression when a still image or a moving image is recorded in the recording medium 38 or read from the recording medium 38 may be performed by the image processing circuit 34 or a dedicated compression-decompression circuit.

The LCD driver 35 is a display-device drive unit. The LCD driver 35 reads image data provided with image processing by the image processing circuit 34 and then stored in the DRAM 31, converts the read image data into a video signal, and drives and controls the LCD 36 to display an image based on the video signal on the LCD 36.

The LCD 36 is a display device. The LCD 36 displays an image through the above-described drive control by the LCD driver 35 and displays various kinds of information related to the image pickup apparatus 1. Although the LCD 36 is used as the display device in this example, the invention is not limited to this configuration and another display device such as an organic electroluminescence (organic EL) may be used.

The memory I/F 37 is a recording control unit that performs control to record image data in the recording medium 38 and also read image data from the recording medium 38.

The recording medium 38 is a recording unit that non-volatilely records image data and is configured as, for example, a memory card detachably connectable to the camera body 3. However, the recording medium 38 is not limited to a memory card but may be a disk-shaped recording medium or any other recording medium. The recording medium 38 may be built in the camera body 3. In this manner, the recording medium 38 is not limited to a configuration unique to the image pickup apparatus 1.

The operation device 39 is used to perform various kinds of inputting operation to the image pickup apparatus 1 and includes operation buttons such as a power source button, a release button, a playback button, a menu button, a cross key, and an OK button. The power source button is used to power on and off the image pickup apparatus 1. The release button is used to instruct image shooting start. The release button is configured as, for example, a two-stage operation button and includes a first release switch and a second release switch. The playback button is used to perform recorded image playback. The menu button is used to performed setting of the image pickup apparatus 1 and the like. The cross key is used for, for example, an item selection operation. The OK button is used for, for example, a selected item confirmation operation.

Examples of items that can be set by using the menu button, the cross key, the OK button, and the like include a shooting mode (such as a still image shooting mode, a pixel shift super-resolution shooting mode, or a moving image shooting mode), a recording mode, a playback mode, and switching of an image stabilization function. When an operation is performed on the operation device 39, the operation device 39 outputs a signal in accordance with contents of the operation to the body-side microcomputer 41.

The flash memory 40 is a computer-readable non-transitory recording medium that non-volatilely records processing programs (including a shooting program for image shooting, an image processing program for high-resolution image synthesis based on picked-up images, and the like) executed by the body-side microcomputer 41 and various kinds of information related to the image pickup apparatus 1. Examples of information recorded in the flash memory 40 include a model name and a manufacturing number for specifying the image pickup apparatus 1, parameters used for image processing, and setting values set by a user. The information recorded in the flash memory 40 is read by the body-side microcomputer 41.

The body-side microcomputer 41 constitutes a control unit that collectively controls the image pickup apparatus 1. The body-side microcomputer 41 controls each component in the camera body 3 and also controls the interchangeable lens 2 by transmitting a command to the lens-side microcomputer 15 through the interface 27. When an operation is inputted through the operation device 39 by the user, the body-side microcomputer 41 analyzes inputted information, reads parameters necessary for processing from the flash memory 40 and performs various kinds of arithmetic processing and the like in accordance with a processing program recorded in the flash memory 40, and executes various sequences in accordance with contents of the operation.

The body-side microcomputer 41 controls the optical aperture 12 based on the Av value calculated by the AE processing circuit 33. This control is performed by the lens-side microcomputer 15 and the lens driver 13 through the lens driver 13. The body-side microcomputer 41 performs gain control of the analog processing circuit 28 (or digital gain control of the image processing circuit 34) based on the Sv value calculated by the AE processing circuit 33.

At still image shooting and pixel shift super-resolution shooting, the body-side microcomputer 41 controls the mechanical shutter 21 (or the above-described electronic shutter) through the shutter driver 22 (or the image pickup device driver 24) based on the Tv value calculated by the AE processing circuit 33.

When the image stabilization function is switched on and the image pickup apparatus 1 is set to the pixel shift super-resolution shooting mode, the image stabilization mechanism 25 performs image stabilization and pixel shift under control of the body-side microcomputer 41 through the image stabilization driver 26.

When the image pickup apparatus 1 is set to the pixel shift super-resolution shooting mode, the body-side microcomputer 41 generates one piece of synthesized image data (high-resolution image data) by synthesizing a plurality of pieces of image data acquired during pixel shift in accordance with the image processing program for synthesizing a high-resolution image stored in the flash memory 40. The high-resolution image is an image having a resolution higher than a resolution of one-frame images obtained from the image pickup device 23. Thus, the body-side microcomputer 41, the flash memory 40, and the DRAM 31 storing image data are a processor that functions as an image synthesizer.

Note that the above description is made with an example in which the processor including the body-side microcomputer 41 functions as the image synthesizer, but the invention is not limited to this configuration. For example, the image processing circuit 34 may function as the image synthesizer or another non-illustrated processor may be configured to function as the image synthesizer. Each processor may be configured as a computer in which a CPU performs processing in accordance with a computer program (software) stored in a memory, may be configured as a field programmable gate array (FPGA), or may be configured as an electronic circuit dedicated for processing.

In an exemplary configuration of the present embodiment, the processor including the body-side microcomputer 41 functions as a first motion detection unit, performs frequency analysis on a plurality of pieces of image data of different exposure time periods, and detects a motion region in the image data.

The processor including the body-side microcomputer 41 also functions as a second motion detection unit, performs block matching (BM) on a plurality of pieces of image data with different exposure time points, and acquires motion detection information of an object image in the image data.

The processor including the body-side microcomputer 41 also functions as a control unit that controls the image pickup device 23, the first motion detection unit, the second motion detection unit, and the image synthesizer.

Figure 2:
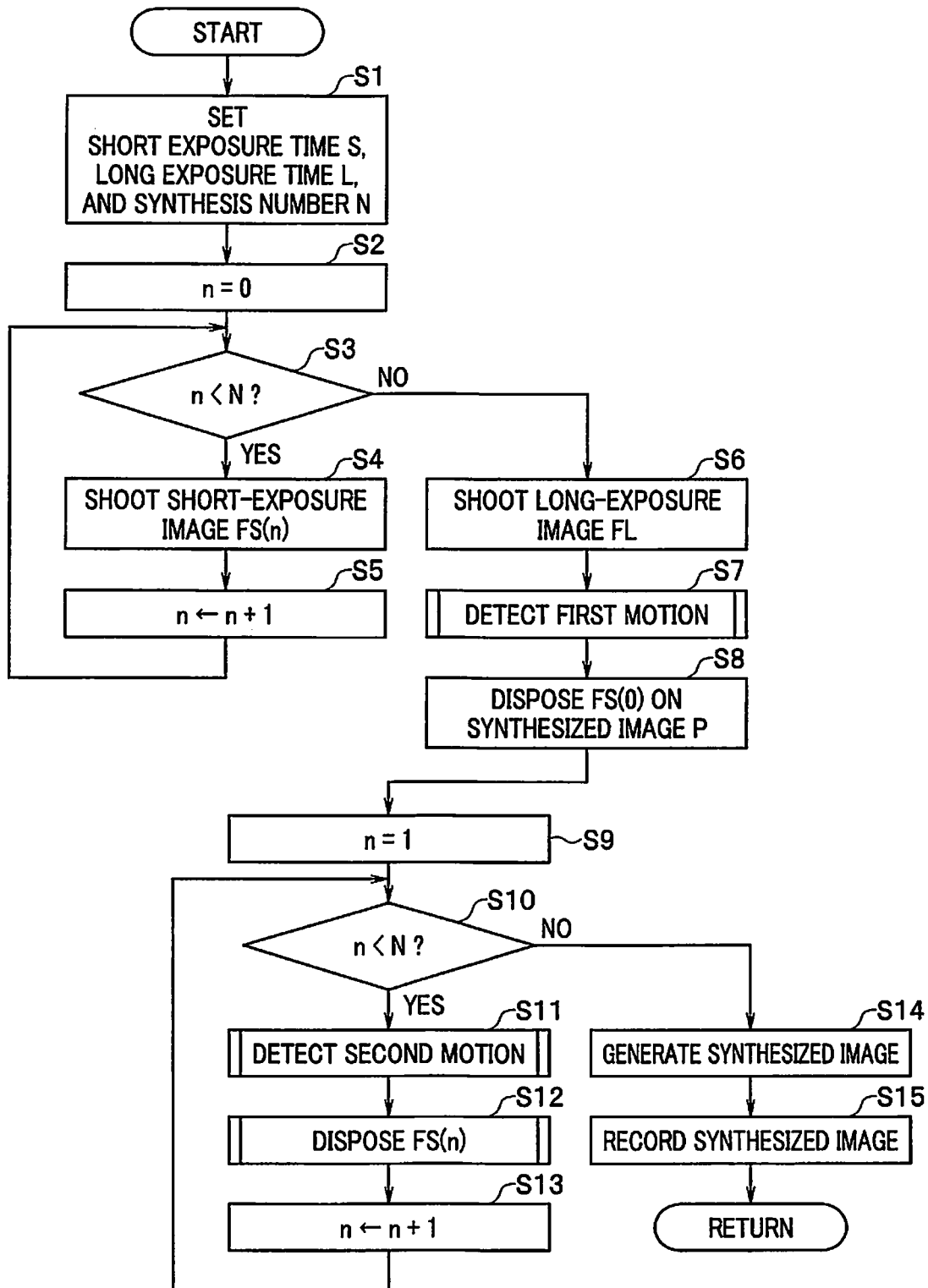
FIG. 2 is a flowchart illustrating processing at synthesized image generation in the image pickup apparatus in the above-described first embodiment.

FIG. 2 is a flowchart illustrating processing at synthesized image generation in the image pickup apparatus 1. The processing illustrated in FIG. 2 is performed based on control by the body-side microcomputer 41 included in the processor.

When the image stabilization function is off at shooting of a plurality of images for generating a high-resolution image, a shot object does not match at peripheral parts of the plurality of images and a high-resolution image cannot be generated at the peripheral parts of the images. Thus, it is preferable that the image stabilization function be basically on in the pixel shift super-resolution shooting mode. Thus, the following description is made on an assumption that the image stabilization function is switched on and the pixel shift super-resolution shooting mode is set. Note that, at shooting with a camera fixed to a tripod, the image stabilization function may be switched off to suppress an error cause due to the image stabilization function.

When the processing is started, a short exposure time period S (first exposure time period) and a long exposure time period L (second exposure time period longer than the first exposure time period) are set based on the appropriate exposure condition set by the AE processing circuit 33, and a synthesis number N is set based on the pixel shift super-resolution shooting mode (step S1).

Zero is set to a counter n for counting the number of shot images (step S2), and it is determined whether n is smaller than N (step S3).

Figure 6:
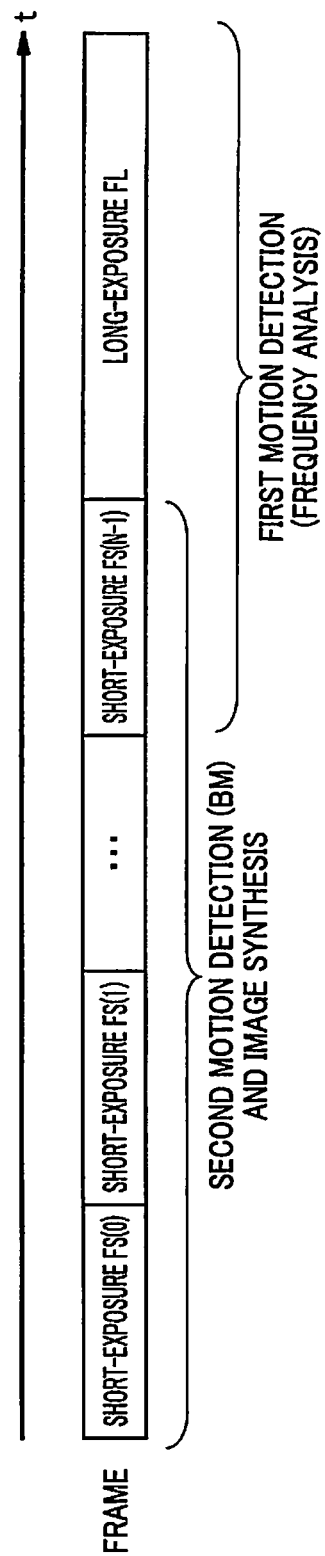
FIG. 6 is a timing chart illustrating a shooting order of short-exposure images and a long-exposure image in the above-described first embodiment.

When it is determined that n is smaller than N, a short-exposure image FS(n) (first image data) is shot with the short exposure time period S (step S4). Thereafter, n is incremented (step S5), and then the processing returns to step S3. The processing at steps S4 and S5 is repeated until it is determined that n has become equal to or larger than N at step S3. Accordingly, the body-side microcomputer 41 included in the processor causes the image pickup device 23 to perform exposure in the short exposure time period S a plurality of times and acquires a plurality of short-exposure images FS(0) to FS(N−1) with different exposure time points from the image pickup device 23. FIG. 6 is a timing chart illustrating a shooting order of the short-exposure images FS(0) to FS(N−1) and a long-exposure image FL.

When it is determined that n is equal to or larger than N at step S3, the body-side microcomputer 41 included in the processor causes the image pickup device 23 to perform exposure in the long exposure time period L and acquires the long-exposure image FL (second image data) from the image pickup device 23 (step S6). Accordingly, the long-exposure image FL is shot next to the short-exposure image FS(N−1) as illustrated in FIG. 6. In this case, the body-side microcomputer 41 controls the optical aperture 12 so that an exposure amount of the long-exposure image FL is equivalent to an exposure amount of the short-exposure images FS(0) to FS(N−1).

Note that exposure time period control at shooting of the short-exposure image FS(n) and the long-exposure image FL is performed by, for example, the mechanical shutter 21. In this case, screen speed is faster than when the control is performed by the electronic shutter, and thus distortion (what is called rolling shutter distortion) of a moving object can be reduced.

Alternatively, the exposure time period control may be performed by, for example, the electronic shutter of the image pickup device 23. The electronic shutter does not need shutter charge, which is needed for the mechanical shutter 21, and thus can reduce a time lag between exposures. Accordingly, a moving amount of a moving object between the first short-exposure image FS(0) and the last short-exposure image FS(N−1) can be reduced.

Furthermore, although the long-exposure image FL is shot last in the shooting order illustrated in FIG. 6, for example, the long-exposure image FL may be shot first and then a plurality of short-exposure images may be shot. In this case, first motion detection may be performed by using the long-exposure image FL and a short-exposure image shot first (in other words, a short-exposure image having a shooting time point closest to a shooting time point of the long-exposure image FL and highly correlated with the long-exposure image FL). The invention is not limited to these examples but the long-exposure image FL may be shot in another order.

Moreover, although only one long-exposure image FL is shot in an example illustrated in FIG. 6, two or more long-exposure images FL may be shot to obtain an increased amount of motion detection information.

Figure 3:
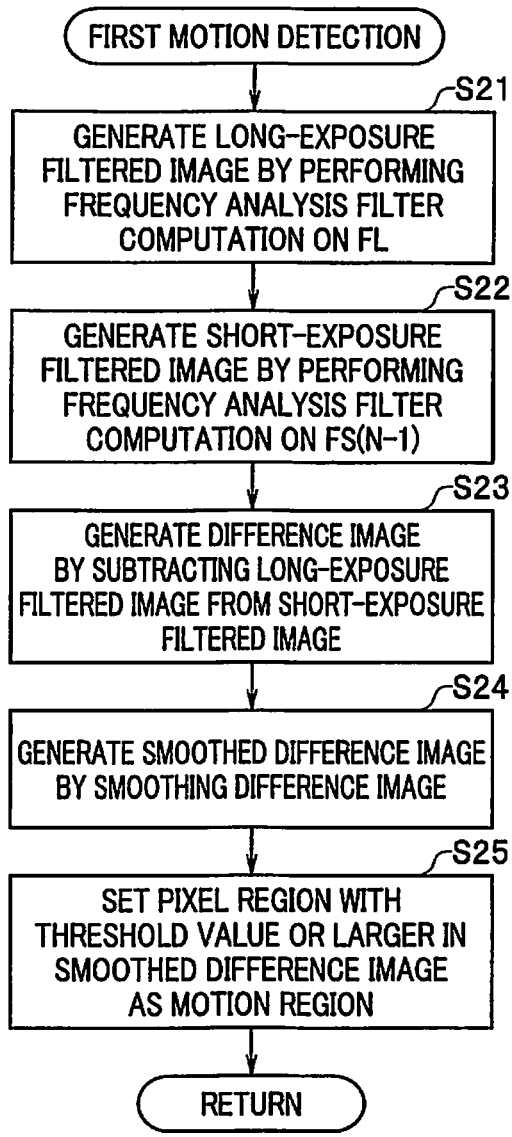
FIG. 3 is a flowchart illustrating processing of first motion detection in the above-described first embodiment.

After the long-exposure image FL is shot, the processor including the body-side microcomputer 41 performs processing of the first motion detection (step S7). FIG. 3 is a flowchart illustrating the processing of the first motion detection.

Figure 9:
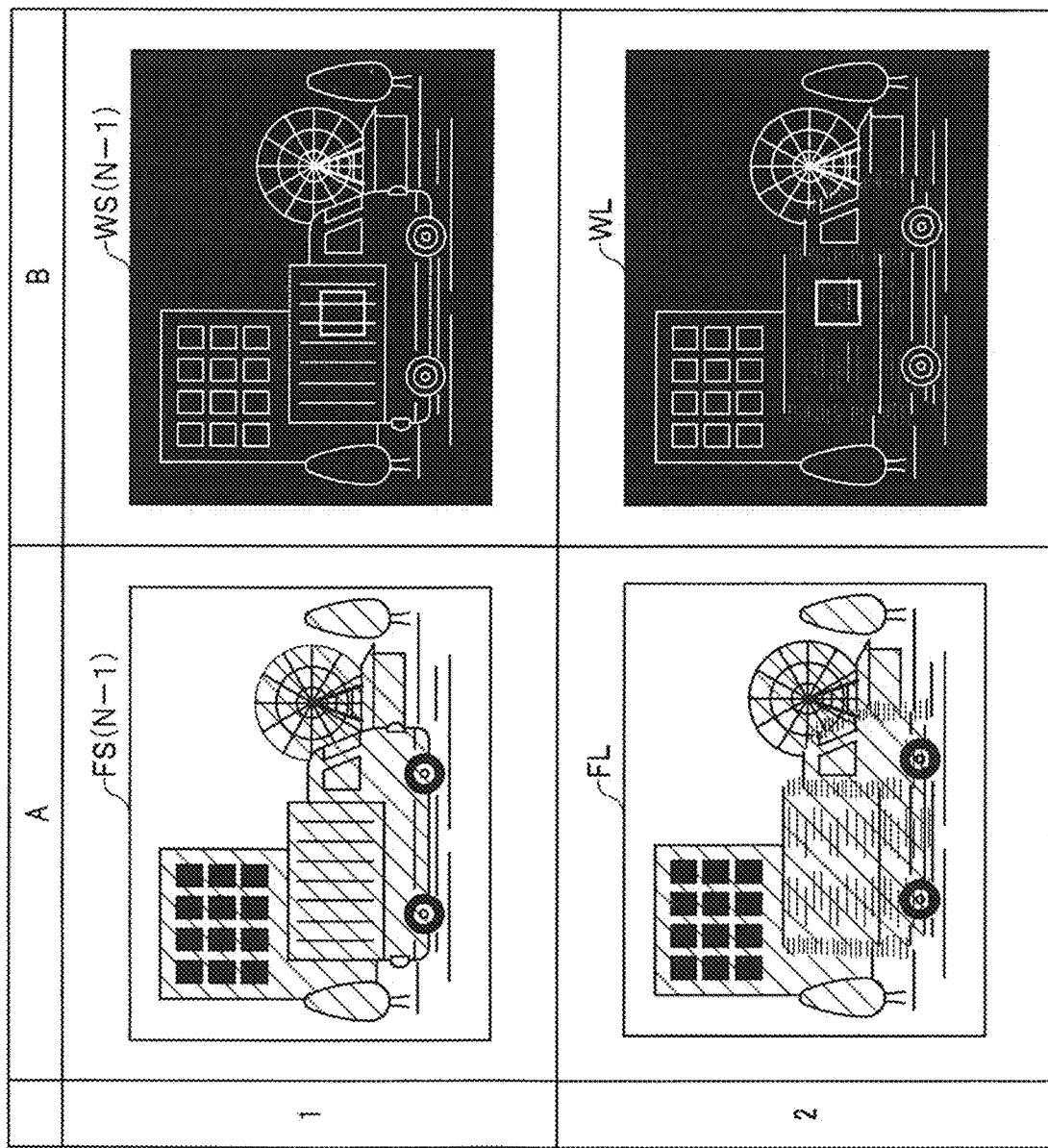
FIG. 9 is a diagram illustrating an example of frequency analysis on a short-exposure image and a long-exposure image in the above-described first embodiment.

When the processing in FIG. 3 is started, frequency analysis filter computation (filter processing) is performed on a focus region of the long-exposure image FL, which is illustrated in a cell 2A in FIG. 9, while the focus region is moved in, for example, a raster scanning order, and accordingly, a long-exposure filtered image WL illustrated in a cell 2B in FIG. 9 is generated (step S21).

Figure 10:
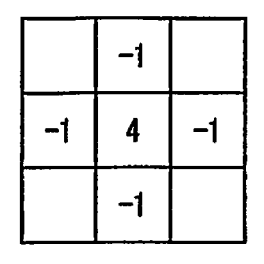

FIG. 9 is a diagram illustrating an example of frequency analysis on the short-exposure image FS(N−1) and the long-exposure image FL. FIG. 10 is a diagram illustrating an example of a filter used for frequency analysis. The filter illustrated in FIG. 10 is a two-dimensional Laplacian filter as one of basic filters with which two-dimensional edges can be extracted. Note that, the filter used for frequency analysis is neither limited to the two-dimensional Laplacian filter nor limited to an edge extraction filter.

Subsequently, frequency analysis filter computation is performed on a focus region of the short-exposure image FS(N−1), which is illustrated in a cell 1A in FIG. 9, while the focus region is moved in, for example, the raster scanning order, and accordingly, a short-exposure filtered image WS(N−1) illustrated in a cell 1B in FIG. 9 is generated (step S22). The short-exposure image FS(N−1) is used among the plurality of short-exposure images FS(0) to FS(N−1) because the short-exposure image FS(N−1) has a shooting time point closest to the shooting time point of the long-exposure image FL and has highest correlation with the long-exposure image FL (refer to FIG. 6).

In the long-exposure image FL, an image part of a moving object (an image part of a truck in the illustrated example) is blurred and an edge of the image part becomes unclear (refer to a white frame part in the cell 1B and a white frame part in the cell 2B in FIG. 9) compared to the short-exposure image FS(N−1). Accordingly, in the long-exposure filtered image WL, the number of edge components detected in the image part of the moving object decreases as compared to the short-exposure filtered image WS(N−1). Thus, a difference image is generated by subtracting the long-exposure filtered image WL with a smaller amount of edge components from the short-exposure filtered image WS(N−1) with a larger amount of edge components (step S23).

In addition, a smoothed difference image is generated by applying a smoothing filter to the difference image to reduce influence of noise in the difference image (step S24). Note that the processing at step S24 may be omitted when influence of noise does not need to be considered.

In the smoothed difference image, a pixel region in which edge components in a number equal to or larger than a threshold value remain (pixel region in which the number of edge components has decreased in the long-exposure image) is set as a motion region (step S25), and the processing returns to the processing illustrated in FIG. 2. Note that frequency analysis may be performed by a method using a filter or by extracting frequency components through Fourier transform and analyzing a difference among frequency components of the long-exposure image FL and the short-exposure image FS(N−1).

After the processing of the first motion detection at step S7 is performed, processing of disposing pixels of the short-exposure image FS(n) on a synthesized image P in which the number of pixels is larger than the number of pixels of a one-frame image is started. First, pixels of the short-exposure image FS(0), which is shot first, are disposed on the synthesized image P (step S8).

Subsequently, one is set to the counter n (step S9), and it is determined whether n is smaller than N (step S10).

Figure 4:
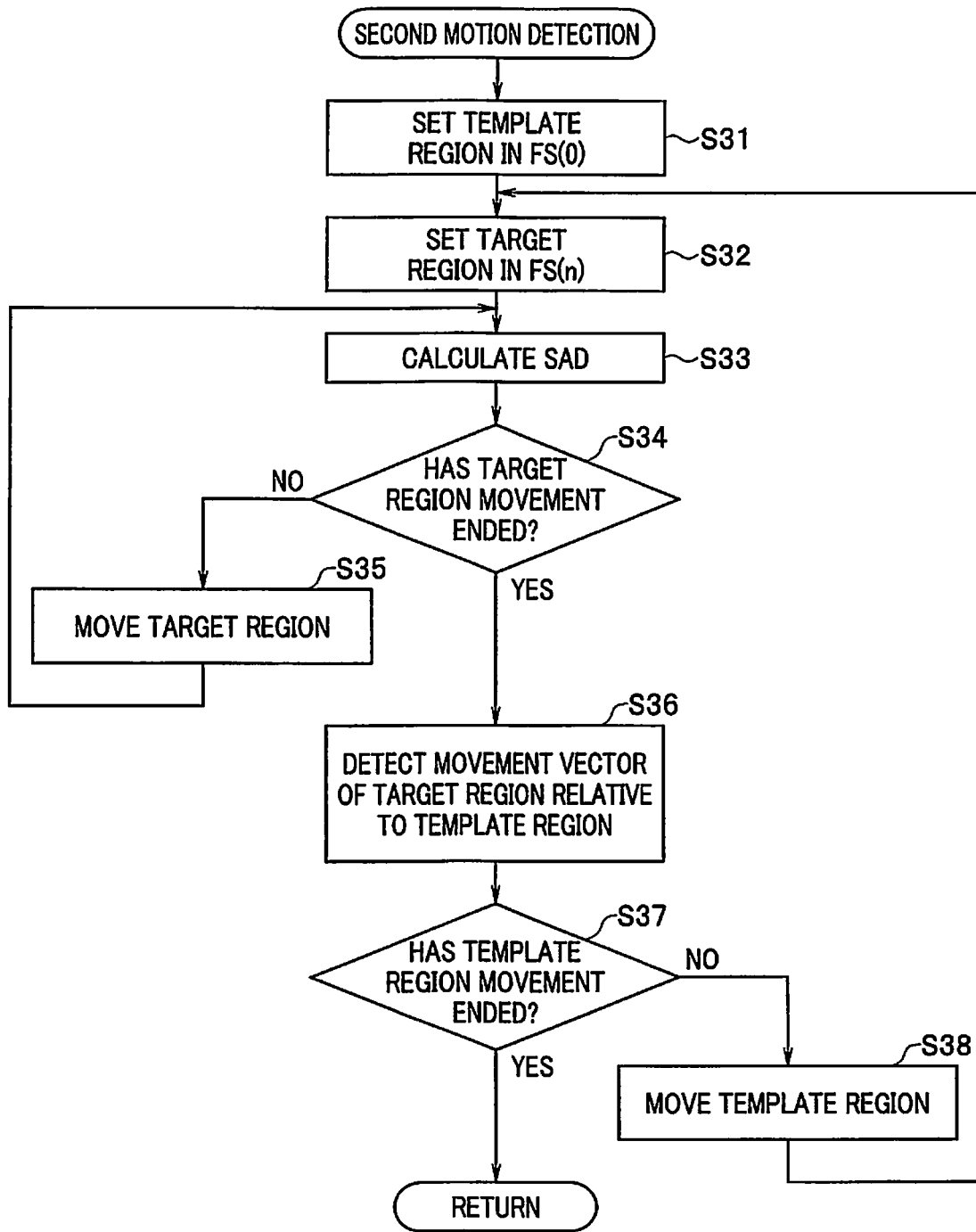
FIG. 4 is a flowchart illustrating processing of second motion detection in the above-described first embodiment.

When it is determined that n is smaller than N, the processor including the body-side microcomputer 41 performs processing of second motion detection (step S11). FIG. 4 is a flowchart illustrating the processing of the second motion detection.

Figure 7:
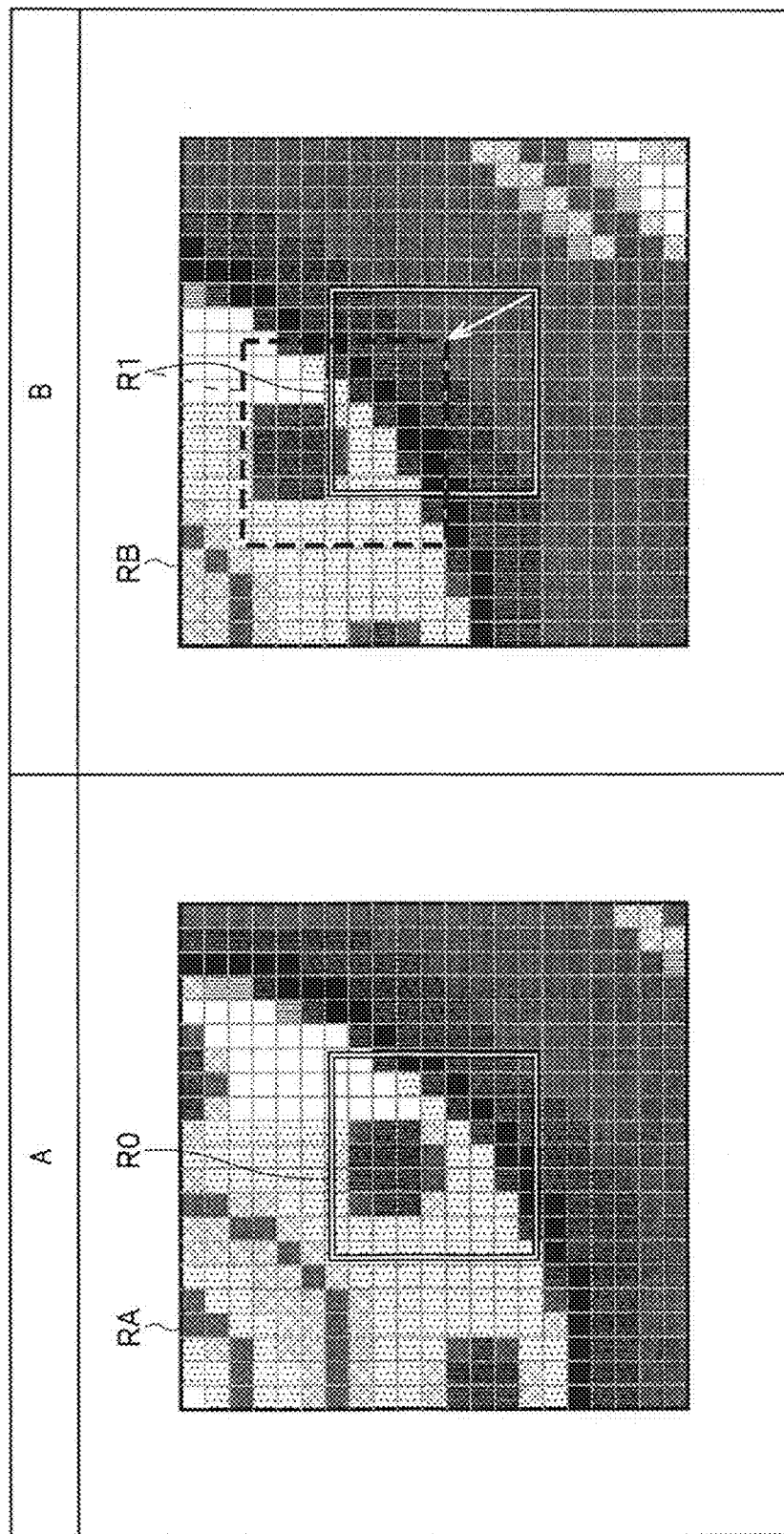
FIG. 7 is a diagram for description of block matching in the above-described first embodiment.

When the processing in FIG. 4 is started, a template region R0 is set in the short-exposure image FS(0) (step S31). FIG. 7 is a diagram for description of block matching. A cell "A" in FIG. 7 illustrates a situation in which the template region R0 constituted by a plurality of pixels is set in a search region RA in the short-exposure image FS(0). Note that the search region RA is a region that includes the template region R0 and is larger than the template region R0.

Subsequently, as illustrated in a column "B" in FIG. 7, a target region R1 is set in a search region RB in the short-exposure image FS(n) with n≥1 (step S32). The target region R1 is a region having a size equal to a size of the template region R0. The search region RB in the short-exposure image FS(n) is set in a size equal to a size of the search region RA at a position same as the search region RA in the short-exposure image FS(0). An initial position of the target region R1 is set at, for example, a position same as the template region R0.

Then, a sum SAD (sum of absolute difference) of an absolute difference between the template region R0 and the target region R1 at each pixel is calculated by, for example, $$SAD=\Sigma|R1(i,j)-R0(i,j)|$$

(step S33). In the above expression, (i,j) are pixel coordinates in the target region R1 and the template region R0, and $\Sigma$ is calculated over (i,j) in the regions. The calculation is performed with the absolute value to evaluate both strength of positive edge components and strength of negative edge components.

Note that the SAD, which requires a small calculation amount, is calculated above, but instead, an SSD (sum of squared difference), an NCC (normalized cross-correlation), and a ZNCC (zero-means normalized cross-correlation), which requires a larger calculation amount, may be calculated.

Subsequently, it is determined whether movement of the target region R1 in the search region RB has ended (step S34). When it is determined that the movement has not ended, the target region R1 is moved in the search region RB (step S35) and the processing returns to step S33 to calculate the SAD.

When it is determined that movement of the target region R1 has ended at step S34, a position of the target region R1 for which the SAD has a minimum value (position of the target region R1, which is illustrated with a dashed line in a cell "B" in FIG. 7), is searched as a position to which the template region R0 has moved, and a movement vector (motion detection information) as illustrated with a white arrow in the cell "B" in FIG. 7 is detected (step S36).

Note that when the movement vector is not correctly detected at step S36, information indicating that motion detection has failed for the template region R0, which is set before the processing at step S36 is started, is stored in the DRAM 31 or the like. Examples of a case in which the movement vector is not correctly detected include a case in which the minimum value of the SAD is larger than a predetermined threshold value (in other words, a case in which a degree of matching between an object in the target region R1 and an object in the template region R0 is lower than a predetermined value), and a case in which the minimum value of the SAD is equal to or smaller than the predetermined threshold value but a plurality of target regions R1 for which the SAD has the minimum value are searched.

Subsequently, it is determined whether movement of the template region R0 in the short-exposure image FS(0) has ended (step S37). When it is determined that the movement has not ended, the template region R0 is moved in the short-exposure image FS(0) (step S38). The template region R0 is moved in, for example, the raster scanning order in the short-exposure image FS(0). Thereafter, the processing returns to step S32 to perform processing as described above.

When it is determined that movement of the template region R0 has ended at step S37, the processing returns to the processing illustrated in FIG. 2.

Figure 8:
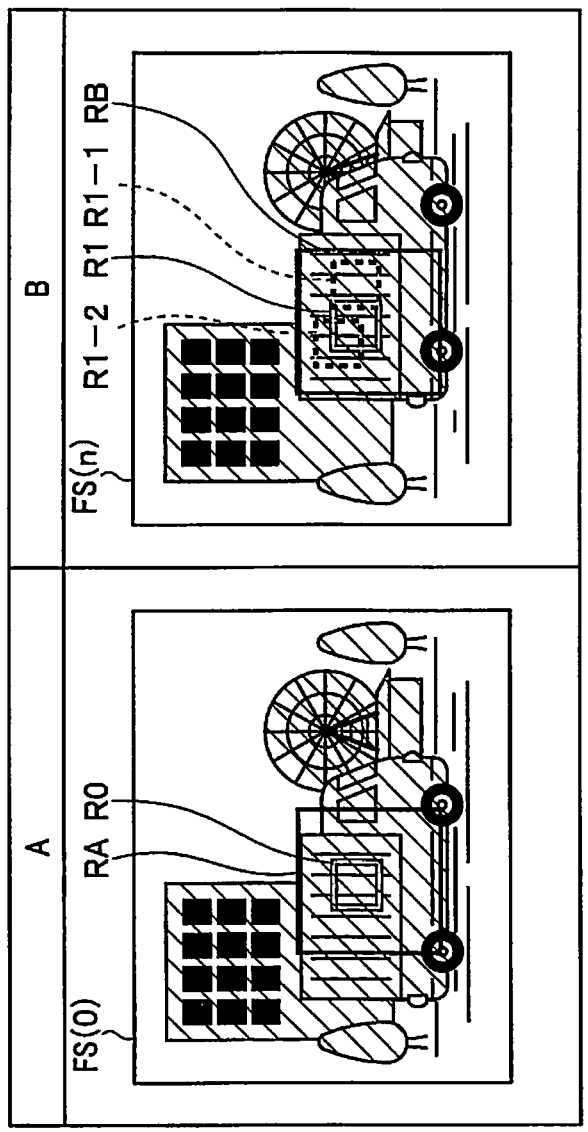
FIG. 8 is a diagram for description of an example of a region not suitable for block matching in the above-described first embodiment.

FIG. 8 is a diagram for description of an example of a region not suitable for block matching. In an example illustrated in FIG. 8, an image part of a truck moving to right is included in an image, and an image part of a container has a repeating pattern.

As illustrated in cell "A" in FIG. 8, the template region R0 is set at the image part of the container in the short-exposure image FS(0), the target region R1 is set in the short-exposure image FS(n) with n≥1, and the target region R1 is moved in the search region RB. The minimum value of the SAD is calculated for, for example, target regions R1-1 and R1-2 at a plurality of positions. When a correct movement vector should be detected for the target region R1-1 but the minimum value of the SAD is calculated for the target region R1-2 as well, it cannot be determined which of the regions R1-1 and R1-2 provides the correct movement vector. Thus, the correct movement vector cannot be detected, and whether motion occurs at the image part of the container cannot be determined as well.

Figure 5:
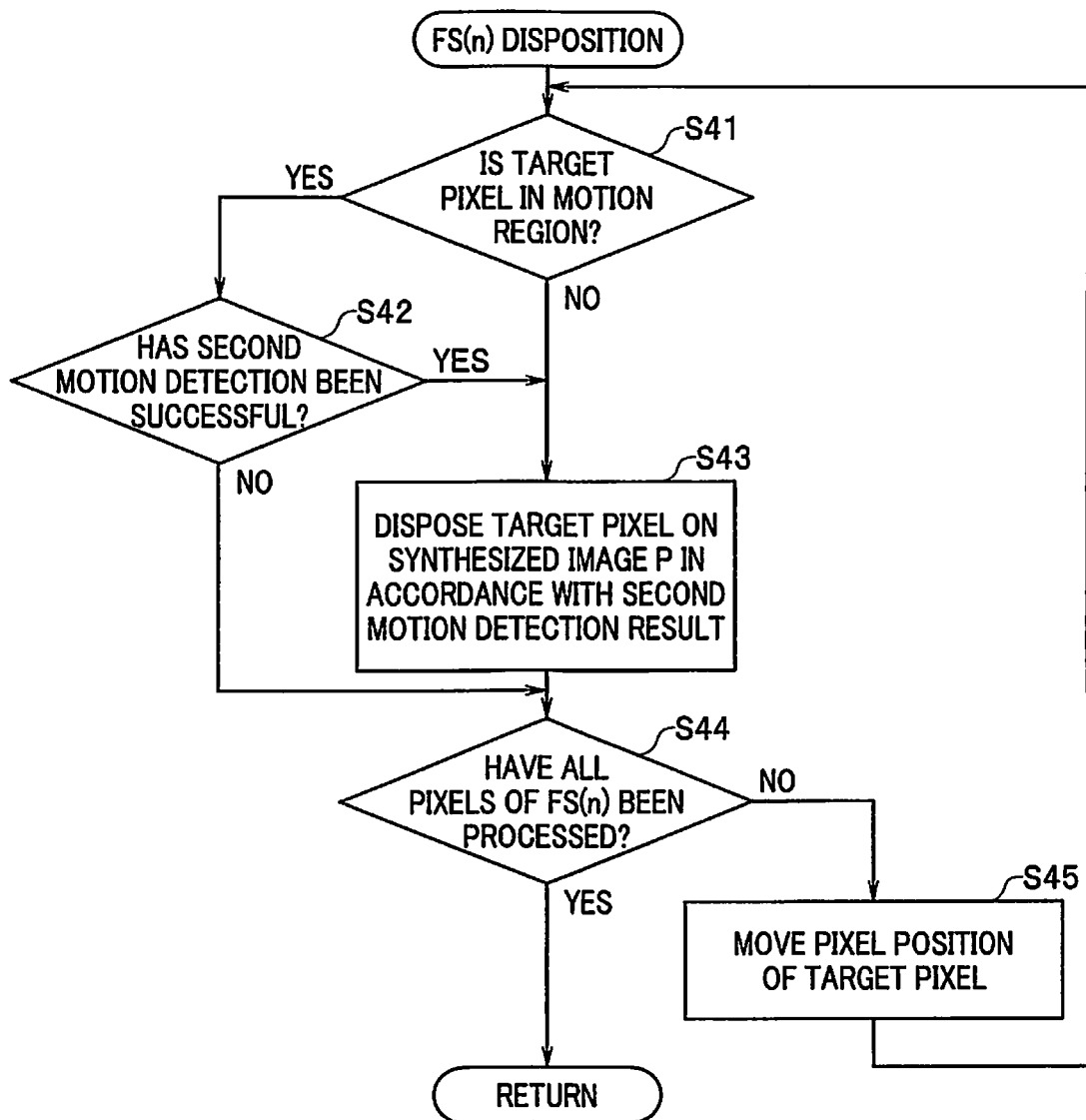
FIG. 5 is a flowchart illustrating processing of short-exposure image FS(n) disposition in the above-described first embodiment.

With such a point taken into consideration, the processor including the body-side microcomputer 41 performs processing of FS(n) disposition after step S11 (step S12). FIG. 5 is a flowchart illustrating the processing of the short-exposure image FS(n) disposition.

When the processing in FIG. 5 is started, one pixel in the short-exposure image FS(n) is set as a target pixel, and it is determined whether the target pixel is a pixel in the motion region (step S41).

When it is determined that the target pixel is a pixel in the motion region, it is further determined whether the target pixel is a pixel for which the second motion detection has been successful (step S42).

When it is determined that the target pixel is not a pixel in the motion region at step S41 or when it is determined that the target pixel is a pixel for which the second motion detection has been successful at step S42, the target pixel is disposed in the synthesized image P in accordance with the movement vector obtained by block matching in the second motion detection at step S11 (step S43). Specifically, the body-side microcomputer 41 disposes the pixel on synthesized image data based on the motion detection information in a region in which acquisition of the motion detection information has been successful in the motion region and a region other than the motion region.

When it is determined that the target pixel is a pixel for which the second motion detection has failed at step S42, the processing at step S43 is skipped. Specifically, the body-side microcomputer 41 disposes no pixel on the synthesized image data in a region in which acquisition of the motion detection information has failed in the motion region. Accordingly, it is possible to prevent artifact generation and image quality degradation when the movement vector is not accurately calculated. In this manner, the body-side microcomputer 41 changes a method of generating synthesized image data based on the motion detection information in accordance with whether the target pixel is in the motion region, and generates one piece of synthesized image data by synthesizing a plurality of pieces of the first image data.

Subsequently, it is determined whether the processing has been performed with the target pixel set to each pixel in the short-exposure image FS(n) (step S44). When there is a pixel yet to be set as the target pixel, a pixel position of the target pixel is moved (step S45), and then the processing returns to step S41 to perform the above-described processing.

Accordingly, when it is determined that the processing has been performed with the target pixel set to each pixel in the short-exposure image FS(n) at step S44, the processing returns to the processing illustrated in FIG. 2.

After the processing at step S12 is performed, n is incremented (step S13) and then the processing returns to step S10. The processing at steps S11 to S13 is repeated until it is determined that n has become equal to or larger than N at step S10. Accordingly, all pixels of the short-exposure images FS(1) to FS(N−1) are disposed on the synthesized image P.

When it is determined that n has become equal to or larger than N at step S10, all pixels of the short-exposure images FS(0) to FS(N−1), including FS(0) processed at step S8, are already disposed on the synthesized image P except for a case in which the processing at S43 is skipped.

Subsequently, the processor including the body-side microcomputer 41 generates the synthesized image P based on each disposed pixel (step S14). The synthesized image P includes a pixel position at which one or more pixels from the plurality of short-exposure images are disposed, and also includes a pixel position at which no pixel is disposed in some cases. Thus, a pixel value normalized by dividing the sum of pixel values by the number of pixels is calculated for a pixel position at which a plurality of pixels are disposed. For a pixel position at which no pixel is disposed, a pixel value is calculated through interpolation with surrounding normalized pixel values.

Once the synthesized image is generated, the synthesized image is displayed on the LCD 36 as necessary and recorded in the recording medium 38 under control of the body-side microcomputer 41 (step S15), and then the processing returns to non-illustrated main processing from the processing in FIG. 2.

According to the first embodiment thus configured, a motion region is detected by performing frequency analysis on a plurality of pieces of image data of different exposure time periods, motion detection information is acquired by performing block matching on a plurality of pieces of image data with different exposure time points, and no pixel is disposed on synthesized image data in a region in which the acquisition of the motion detection information has failed in the motion region. Thus, it is possible to prevent artifact generation at an image part for which block matching is difficult, thereby preventing image quality degradation. Accordingly, it is possible to appropriately generate synthesized image data having a resolution higher than a resolution of image data generated by the image pickup device 23.

In addition, it is possible to improve accuracy of frequency analysis by controlling the optical aperture 12 so that the exposure amount of the second image data is equivalent to the exposure amount of the first image data.

Moreover, it is possible to reduce distortion of a moving object when exposure time periods are controlled by the mechanical shutter 21. Furthermore, it is possible to reduce a time lag between exposures and thus a moving amount of a moving object when exposure time periods are controlled by the electronic shutter of the image pickup device 23.

Second Embodiment

Figure 12:
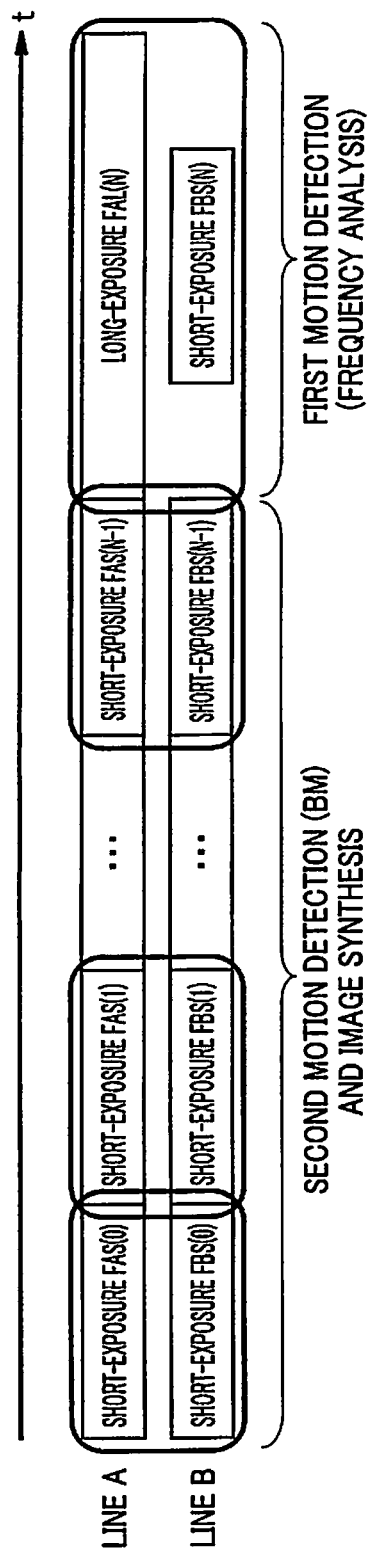
FIG. 12 is a timing chart illustrating a shooting order of short-exposure images and a long-exposure image in accordance with lines in the above-described second embodiment.
Figure 13:
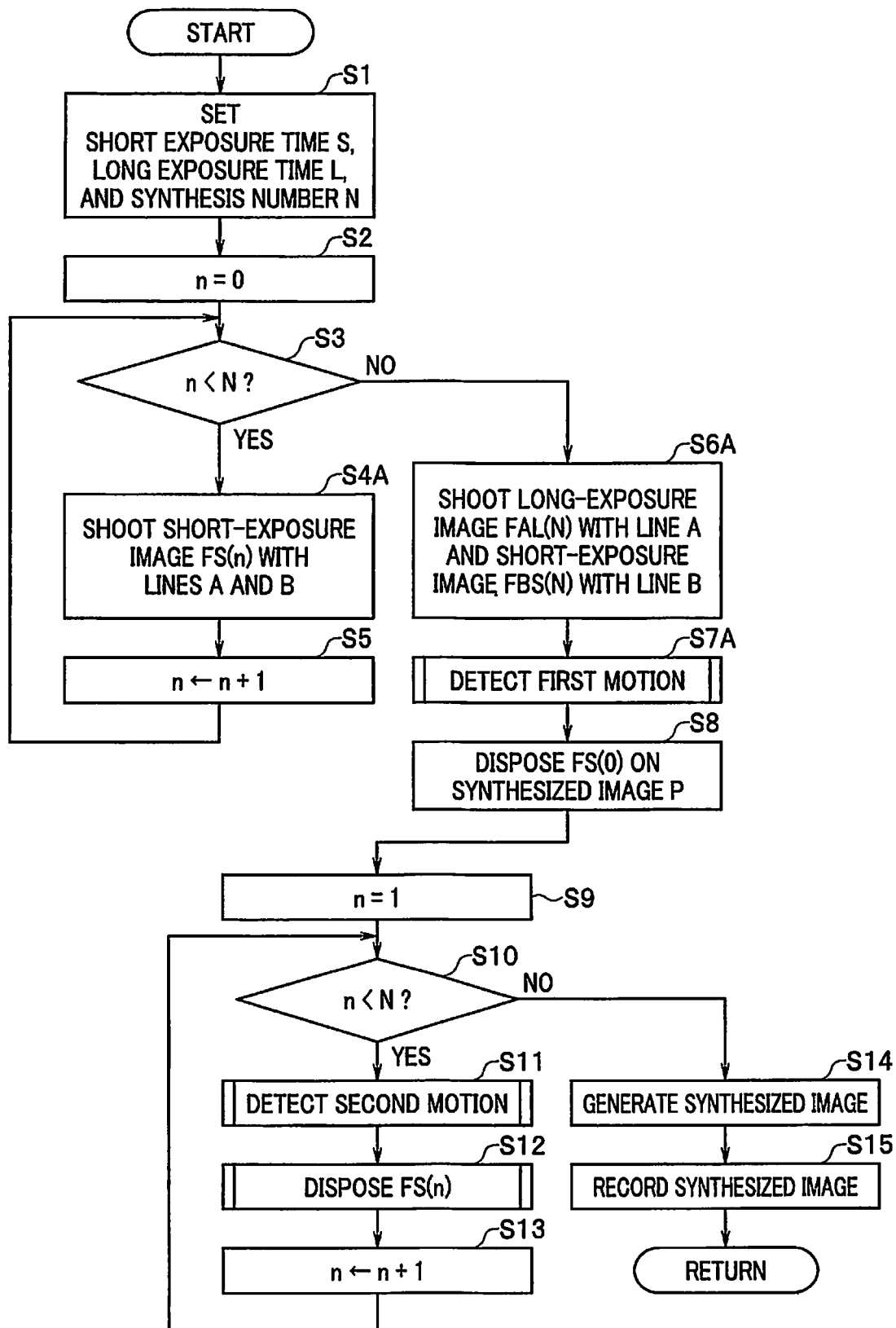
FIG. 13 is a flowchart illustrating processing at synthesized image generation in an image pickup apparatus of the above-described second embodiment.

FIGS. 11 to 13 illustrate a second embodiment of the invention, and FIG. 11 is a diagram illustrating an example of an image pickup device that can differentiate an exposure time period among lines. In the second embodiment, any part same as in the above-described first embodiment is denoted by the same reference sign and description of the part is omitted as appropriate, and the following description is mainly made on different points.

The configuration of the image pickup apparatus 1 in the present embodiment is basically same as the configuration in the first embodiment, which is illustrated in FIG. 1. However, the image pickup device 23 includes an electronic shutter capable of controlling different exposure time periods between a first line group and a second line group among a plurality of lines in which a plurality of pixels are arrayed.

As illustrated in FIG. 11, the image pickup device 23 includes an R pixel, a Gr pixel, a B pixel, and a Gb pixel arrayed in the primary color Bayer array. As for a line (basic array line) (two lines of a line of the R pixel and the Gr pixel and a line of the B pixel and the Gb pixel, which is adjacent to the line) constituted by basic arrays of (2, 2) pixels, for example, an odd-numbered basic array line is referred to as a line A and an even-numbered basic array line is referred to as a line B. In this case, the image pickup device 23 can control different exposure time periods between the line A included in the second line group and the line B included in the first line group.

FIG. 12 is a timing chart illustrating a shooting order of short-exposure images FAS(n) and FBS(n) and a long-exposure image FAL(N) in accordance with the lines A and B. FIG. 13 is a flowchart illustrating processing at synthesized image generation in the image pickup apparatus 1.

The processing in FIG. 13 is different from the processing in FIG. 2 in the first embodiment at the following points.

Instead of the processing at step S4, the short-exposure image FS(n) is shot with the lines A and B (step S4A). Specifically, as illustrated in FIG. 12, the short-exposure image FAS(n) is acquired with the line A and the short-exposure image FBS(n) is acquired with the line B, and the short-exposure image FS(n) is generated by collecting FAS(n) and FBS(n) into one image.

Instead of the processing at step S6, as illustrated in FIG. 12, the long-exposure image FAL(N) is acquired with the line A (a second line group) and a short-exposure image FBS(N) is acquired with the line B (first line group) (step S6A). Note that a short-exposure image FAS(N) may be acquired with the line A and a long-exposure image FBL(N) may be acquired with the line B. In this case, the line A belongs to the first line group, and the line B belongs to the second line group.

Specifically, the body-side microcomputer 41 included in the processor exposes the first line group of the image pickup device 23 in a first exposure time period and simultaneously exposes the second line group of the image pickup device 23 in a second exposure time period longer than the first exposure time period, and then acquires first image data related to the first line group and second image data related to the second line group from the image pickup device 23.

Through this processing, the long-exposure image FAL(N) and the short-exposure image FBS(N) are simultaneously shot and thus can have higher correlation than when the images are shot at different time points. In this case, to further increase the correlation, it is preferable to match an exposure central time point of the long-exposure image FAL(N) and an exposure central time point of the short-exposure image FBS(n).

Instead of the processing at step S7, first motion detection is performed by using the long-exposure image FAL(N) and the short-exposure image FBS(N) (step S7A). Processing of the first motion detection is same as the processing illustrated in FIG. 3 except that the long-exposure image FAL(N) and the short-exposure image FBS(N) are used.

Specifically, the body-side microcomputer 41 included in the processor detects a motion region by using the first image data related to the first line group and the second image data related to the second line group.

The long-exposure image FAL(N) and the short-exposure image FBS(N) each have an image resolution equal to half of a normal resolution, but the image resolution causes no difficulties for frequency analysis in the first motion detection. However, these images are not used for high-resolution image synthesis in which resolution is prioritized. Instead, the full-resolution short-exposure images FS(0) to FS(N−1) acquired with the lines A and B set to the same short exposure time period S are used for the image synthesis. The full-resolution short-exposure images FS(0) to FS(N−1) are also used for block matching in the second motion detection.

Thus, processing at step S8 and later is same as in FIG. 2.

According to the second embodiment described thus configured, effects substantially same as effects of the first embodiment described above are obtained. In addition, since frequency analysis is performed by using the long-exposure image FAL(N) and the short-exposure image FBS(N) that are simultaneously shot and highly correlated, it is possible to more highly accurately detect a motion region in image data.

Note that the above description is mainly made on a case in which the invention is an image pickup apparatus, but the invention is not limited to the case.

The invention may be an image processing apparatus configured to generate a synthesized image based on a plurality of pieces of first image data with different exposure time points and a first exposure time period and second image data with a second exposure time period longer than the first exposure time period.

Specifically, in the image pickup apparatus 1, for example, the short-exposure images FS(0) to FS(N−1) and the long-exposure image FL are acquired and stored in the recording medium 38. Subsequently, the recording medium 38 is connected to a computer including a CPU and a memory, and the short-exposure images FS(0) to FS(N−1) and the long-exposure image FL are stored in the memory of the computer. In addition, a computer program for high-resolution image synthesis is stored in the memory of the computer. The computer program may be executed by the computer to perform the first motion detection, the second motion detection, and the image synthesis processing. In this case, the computer including the CPU and the memory functions as an image processing apparatus.

Furthermore, the invention is not limited to an image pickup apparatus nor an image processing apparatus but may be, for example, an image pickup method that performs processing same as processing performed by the image pickup apparatus, an image processing method that performs processing same as processing performed by the image processing apparatus, a computer program for causing a computer to perform processing same as processing performed by the image pickup method, a computer program for causing a computer to perform processing same as processing performed by the image processing method, and a computer-readable non-transitory storage medium storing any of these computer programs.

Some examples of a storage medium storing a computer program product include a portable storage medium such as a flexible disk or a CD-ROM, and a storage medium such as a hard disk (HDD) or a solid state drive (SSD). Not all the computer program necessarily needs to be stored in the storage medium, but only part of the computer program may be stored. Moreover, the computer program may be entirely or partially distributed or provided through a communication network. When a user installs the computer program onto a computer from the storage medium or downloads the computer program through a communication network and installs the computer program onto a computer, the computer program is read by the computer, the entire or partial operation is executed, and accordingly, above-described operation of the image pickup apparatus and the image processing apparatus is executed.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
a lens through which an optical image of an object is formed;
an image pickup device configured to generate image data through exposure to the optical image; and
a processor,
wherein the processor
causes the image pickup device to perform exposure in a first exposure time period a plurality of times and acquires a plurality of pieces of first image data with different exposure time points from the image pickup device,
causes the image pickup device to perform exposure in a second exposure time period longer than the first exposure time period and acquires second image data from the image pickup device,
detects a motion region in the image data by performing frequency analysis on certain first image data among the plurality of pieces of first image data and the second image data,
acquires motion detection information of an object image in the image data by performing block matching on the plurality of pieces of first image data, and
changes a method of generating synthesized image data based on the motion detection information in accordance with whether the motion region is detected, and generates one piece of synthesized image data by synthesizing the plurality of pieces of first image data.

2. The image pickup apparatus according to claim 1, wherein, in the generation of the synthesized image data, the processor generates the synthesized image data having a resolution higher than a resolution of the image data generated by the image pickup device.

3. The image pickup apparatus according to claim 1, further comprising an optical aperture configured to adjust light intensity of the optical image formed by the lens, wherein the processor controls the optical aperture so that an exposure amount of the second image data is equivalent to an exposure amount of the first image data.

4. The image pickup apparatus according to claim 1, further comprising a mechanical shutter disposed between the lens and the image pickup device, wherein the processor controls an exposure time period of the image pickup device through the mechanical shutter.

5. The image pickup apparatus according to claim 1, wherein
the image pickup device has a function of an electronic shutter, and
the processor controls an exposure time period of the image pickup device through the electronic shutter.

6. The image pickup apparatus according to claim 5, wherein
the image pickup device includes a plurality of lines in which a plurality of pixels are arrayed,
the electronic shutter can control a first line group and a second line group among the plurality of lines with different exposure time periods, and
the processor
causes the first line group to perform exposure in the first exposure time period, simultaneously causes the second line group to perform exposure in the second exposure time period, and acquires the first image data of the first line group and the second image data of the second line group from the image pickup device, and
detects the motion region by using the first image data of the first line group and the second image data of the second line group.

7. The image pickup apparatus according to claim 1, wherein the processor
performs, for the plurality of pieces of first image data, no pixel disposition on the synthesized image data in a region in which the acquisition of the motion detection information fails in the motion region, and pixel disposition on the synthesized image data based on the motion detection information in a region in which the acquisition of the motion detection information is successful in the motion region and a region other than the motion region, and
generates the synthesized image data by performing normalization in accordance with the number of pixels disposed at a same position.

8. The image pickup apparatus according to claim 1, wherein the processor performs the frequency analysis by analyzing a difference among edge components extracted by providing filter processing to the plurality of pieces of image data, or by analyzing a difference among frequency components extracted by subjecting the plurality of pieces of image data to Fourier transform.

9. An image pickup method for an image pickup apparatus including a lens through which an optical image of an object is formed and an image pickup device configured to generate image data through exposure to the optical image, the image pickup method comprising:
causing the image pickup device to perform exposure in a first exposure time period a plurality of times and acquiring a plurality of pieces of first image data with different exposure time points from the image pickup device;
causing the image pickup device to perform exposure in a second exposure time period longer than the first exposure time period and acquiring second image data from the image pickup device;
detecting a motion region in the image data by performing frequency analysis on certain first image data among the plurality of pieces of first image data and the second image data;
acquiring motion detection information of an object image in the image data by performing block matching on the plurality of pieces of first image data; and
changing a method of generating synthesized image data based on the motion detection information in accordance with whether the motion region is detected, and generating one piece of synthesized image data by synthesizing the plurality of pieces of first image data.

10. The image pickup method according to claim 9, wherein, in the generation of the synthesized image data, the synthesized image data having a resolution higher than a resolution of the image data generated by the image pickup device is generated.

11. The image pickup method according to claim 9, being an image pickup method for the image pickup apparatus further including an optical aperture configured to adjust light intensity of the optical image formed by the lens, the image pickup method further comprising controlling the optical aperture so that an exposure amount of the second image data is equivalent to an exposure amount of the first image data.

12. The image pickup method according to claim 9, being an image pickup method for the image pickup apparatus further including a mechanical shutter disposed between the lens and the image pickup device, the image pickup method further comprising controlling an exposure time period of the image pickup device through the mechanical shutter.

13. The image pickup method according to claim 9, being an image pickup method for the image pickup apparatus in which the image pickup device has a function of an electronic shutter, the image pickup method further comprising controlling an exposure time period of the image pickup device through the electronic shutter.

14. The image pickup method according to claim 13, being an image pickup method for the image pickup apparatus in which the image pickup device includes a plurality of lines in which a plurality of pixels are arrayed and the electronic shutter can control a first line group and a second line group among the plurality of lines with different exposure time periods, the image pickup method further comprising:
  causing the first line group to perform exposure in the first exposure time period, simultaneously causing the second line group to perform exposure in the second exposure time period, and acquiring the first image data of the first line group and the second image data of the second line group from the image pickup device; and
  detecting the motion region by using the first image data of the first line group and the second image data of the second line group.

15. A non-transitory storage medium that is readable by a computer and stores a computer program for causing the computer to control an image pickup apparatus including a lens through which an optical image of an object is formed and an image pickup device configured to generate image data through exposure to the optical image, wherein the computer program causes the computer to:
  cause the image pickup device to perform exposure in a first exposure time period a plurality of times and acquire a plurality of pieces of first image data with different exposure time points from the image pickup device;
  cause the image pickup device to perform exposure in a second exposure time period longer than the first exposure time period and acquire second image data from the image pickup device;
  detect a motion region in the image data by performing frequency analysis on certain first image data among the plurality of pieces of first image data and the second image data;
  acquire motion detection information of an object image in the image data by performing block matching on the plurality of pieces of first image data; and
  change a method of generating synthesized image data based on the motion detection information in accordance with whether the motion region is detected and generate one piece of synthesized image data by synthesizing the plurality of pieces of first image data.

16. The storage medium according to claim 15, wherein the computer program causes the computer to generate the synthesized image data having a resolution higher than a resolution of the image data generated by the image pickup device.

17. The storage medium according to claim 15, wherein
  the computer program is a computer program for causing the computer to control the image pickup apparatus further including an optical aperture configured to adjust light intensity of the optical image formed by the lens, and
  the computer program causes the computer to control the optical aperture so that an exposure amount of the second image data is equivalent to an exposure amount of the first image data.

18. The storage medium according to claim 15, wherein
  the computer program is a computer program for causing the computer to control the image pickup apparatus further including a mechanical shutter disposed between the lens and the image pickup device, and
  the computer program causes the computer to control an exposure time period of the image pickup device through the mechanical shutter.

19. The storage medium according to claim 15, wherein
  the computer program is a computer program for causing the computer to control the image pickup apparatus in which the image pickup device has a function of an electronic shutter, and
  the computer program causes the computer to control an exposure time period of the image pickup device through the electronic shutter.

20. The storage medium according to claim 19, wherein
  the computer program is a computer program for causing the computer to control the image pickup apparatus in which the image pickup device includes a plurality of lines in which a plurality of pixels are arrayed and the electronic shutter can control a first line group and a second line group among the plurality of lines with different exposure time periods, and
  the computer program causes the computer to:
    cause the first line group to perform exposure in the first exposure time period, simultaneously cause the second line group to perform exposure in the second exposure time period, and acquire the first image data of the first line group and the second image data of the second line group from the image pickup device; and
    detect the motion region by using the first image data of the first line group and the second image data of the second line group.

* * * * *